United States Patent [19]
Johnson, Jr. et al.

[11] Patent Number: 5,907,813
[45] Date of Patent: May 25, 1999

[54] SIGNAL ACQUISITION IN A WIRELESS COMMUNICATION SYSTEM BY TRANSMITTING REPEATED ACCESS PROBES FROM A TERMINAL TO A HUB

[75] Inventors: Derald O. Johnson, Jr.; Paul T. Williamson; James A. Hutchison, IV; Gwain Bayley, all of San Diego, Calif.

[73] Assignee: QUALCOMM Incorporated, San Diego, Calif.

[21] Appl. No.: 08/558,557

[22] Filed: Nov. 30, 1995

[51] Int. Cl.[6] .................................................. H04B 7/212
[52] U.S. Cl. ......................... 455/502; 455/524; 370/508; 375/356
[58] Field of Search ............................. 455/427–30, 12.1, 455/13.1, 13.2, 502, 503, 456, 517, 524, 525; 370/507, 508, 350; 375/356, 358

[56] References Cited

U.S. PATENT DOCUMENTS

| | | | |
|---|---|---|---|
| 4,569,042 | 2/1986 | Larson | 370/508 X |
| 4,658,096 | 4/1987 | West, Jr. et al. | 379/59 |
| 4,737,975 | 4/1988 | Shafer | 379/58 |
| 4,901,307 | 2/1990 | Gilhousen et al. | 370/18 |
| 4,922,517 | 5/1990 | West, Jr. et al. | 379/58 |
| 5,056,109 | 10/1991 | Gilhousen et al. | 375/1 |
| 5,101,501 | 3/1992 | Gilhousen et al. | 455/33 |
| 5,109,390 | 4/1992 | Gilhousen et al. | 375/1 |
| 5,109,528 | 4/1992 | Uddenfeldt | 455/33.2 |
| 5,164,958 | 11/1992 | Omura | 375/1 |
| 5,177,765 | 1/1993 | Holland et al. | 375/1 |
| 5,184,347 | 2/1993 | Farwell et al. | 370/94.1 |
| 5,235,615 | 8/1993 | Omura | 375/1 |
| 5,257,283 | 10/1993 | Gilhousen et al. | 375/1 |
| 5,265,119 | 11/1993 | Gilhousen et al. | 375/1 |
| 5,267,261 | 11/1993 | Blakeney, II et al. | 375/1 |
| 5,267,262 | 11/1993 | Wheatley, III | 375/1 |

(List continued on next page.)

FOREIGN PATENT DOCUMENTS 9200639  1/1992  WIPO .......................... H04L 27/30

OTHER PUBLICATIONS

Klein S. Gilhousen et al, "Increased Capacity Using CDMA for Mobile Satellite Communication", *IEEE Journal On Selected Areas In Communications*, vol. 8, No.4, May 1990, pp. 503–514.

TIA Document entitled "CDMA Intersystem Operations" by Alejandro Holcman et al. of QUALCOMM Incorporated, Presented at IEEE Conference on Vehicular Technology Committee in Stockholm, Sweden on Jun. 8, 1994, 5 pages.

TIA TR45.2 Intersystems Operations Presentation entitled "The Wideband Spread Spectrum Standard Under Development in TR45.5" by Edward G. Tiedemann, Jr. of QUALCOMM Incorporated, presented in Atlanta, Georgia, Nov. 16–20, 1992, 9 pages.

(List continued on next page.)

*Primary Examiner*—Edward F. Urban
*Assistant Examiner*—Philip J. Sobutka
*Attorney, Agent, or Firm*—Russell B. Miller; Brian S. Edmonston; Gregory D. Ogrod

[57] ABSTRACT

A novel and improved method and apparatus for signal acquisition in a wireless telecommunication system having large transmission delay uncertainty is described. A terminal first acquires the forward link signal from a hub and extracts timing information from that forward link signal. Using the timing information the terminal estimates the time at which a next search window takes place during an access slot, and the time and pseudorandom code state necessary to transmit an access probe so as to arrive at during the search window assuming the terminal is located a maximum distance from the hub. The terminal proceeds to transmit additional access probes at times occurring one access slot period plus a delta time interval after the previous transmission. The delta time interval has a duration less than that of a search window associated with each access slot. Each access probe is processed with various transmission codes the states of which are incremented by an access slot period for each access probe transmitted.

21 Claims, 2 Drawing Sheets

U.S. PATENT DOCUMENTS

| | | | |
|---|---|---|---|
| 5,278,892 | 1/1994 | Bolliger et al. | 379/60 |
| 5,295,153 | 3/1994 | Gudmundson | 375/1 |
| 5,305,308 | 4/1994 | English et al. | 370/32.1 |
| 5,317,571 | 5/1994 | Marcel et al. | 370/508 |
| 5,327,577 | 7/1994 | Uddenfeldt | 455/33.2 |
| 5,341,397 | 8/1994 | Gudmundson | 375/1 |
| 5,416,797 | 5/1995 | Gilhousen et al. | 375/705 |
| 5,420,850 | 5/1995 | Umeda et al. | 370/18 |
| 5,432,843 | 7/1995 | Bonta | 379/60 |
| 5,438,565 | 8/1995 | Hemmady et al. | 370/60 |
| 5,617,410 | 4/1997 | Matsumoto | 370/508 |

OTHER PUBLICATIONS

TIA Document entitled "Intersystem Operation With The Proposed Wideband Spread Spectrum Dual–Mode Mobile Station–Base Station Compatibility Standard" by Gadi Karmi et al. of QUALCOMM Incorporated, presented May 18, 1992 in Atlanta, Georgia, pp. 1–37.

TIA Document entitled "Alternative Methods For Inter–Channel Handoff" by Charles E. Wheatley, III of QUAL-COMM Incorporated, presented on Nov. 10–20, 1992, in Atlanta, Georgia, pp. 1–3.

TIA Document entitled "Proposed Draft Liaison Statement to TR45.2" by Edward G. Tiedemann, Jr. of QUALCOMM Incorporated presented Dec. 3–11, 1992 in Phoenix, Arizona, pp. 1–32.

TIA Document entitled "Intersystem Issues For Support Of The Wideband Spread–Spectrum Digital Standard" by Gadi Karmi of QUALCOMM Incorporated presented Oct. 6, 1992 in Boston, Massachusetts, pp. 1–7.

TIA/EIA Telecommunications Systems Bulletin entitled "Cellular Radiotelecommunications Intersystem Operations: Authentication, Signaling Message Encryption and Voice Privacy", May 1993, 9 pages.

EIA/TIA interim Standard entitled "Cellular Radiotelecommunications Intersystem Operations: Intersystem Handoff", Dec. 1991, 18 pages.

TIA/EIA Telecommunications Systems Bulletin entitled "IS–41–B Mobile Border System Problems", Apr. 1994, 26 pages.

TIA/EIA Telecommunications Systems Bulletin entitled "IS–41–B Support for Dual Mode Wideband Spread Spectrum Mobile Stations", Jan. 1994, 14 pages.

TIA Document entitled "Soft Handoff Frame Format" by Edward G. Tiedemann, Jr. of QUALCOMM Incorporated presented Dec. 11–14, 1995 in Dallas, Texas, pp. 1–7.

SIGNAL ACQUISITION IN A WIRELESS COMMUNICATION SYSTEM BY TRANSMITTING REPEATED ACCESS PROBES FROM A TERMINAL TO A HUB

BACKGROUND OF THE INVENTION

1. Field of the Invention

The present invention relates to wireless telecommunications. More particularly, the present invention relates to a method and apparatus for signal acquisition in a wireless telecommunication system having large distance uncertainty between a terminal and hub.

2. Description of the Related Art

Digital wireless telecommunication systems interface multiple terminals to a hub via the use of digitally modulated radio frequency (RF) signals. This allows each terminal to provide telecommunication service to an individual user or subscriber without the need of wirebased connections. One example of a digital wireless telecommunication system that incorporates the hub and terminal architecture is a cellular telephone system. The hub in a cellular telephone system is referred to as the base station, and the terminals are referred to as mobile units or cellular telephones. In general, the digitally modulated RF electromagnetic signals used in a digital wireless telecommunication system are transmitted between the hub and terminals in a manner that allows various telecommunication services to be provided including audio based telephone service as well as fax and digital data transmission service. An RF signal transmitted from the hub to a terminal is referred to as the forward link signal, and an RF signal transmitted from a terminal to the hub is referred to as a reverse link signal.

Code division multiple access (CDMA) digital signal modulation is one example of a digital signal modulation technique that is employed within digital wireless telecommunication systems. In order for a wireless communication link to be established between a hub and a terminal utilizing CDMA modulated signals, the forward and reverse link signals must be "acquired" by the terminal and hub respectively. Signal acquisition is the process of synchronizing the state of a set of pseudorandom noise (PN) codes used to modulate the digital data before transmission with the state of another set of PN codes used to demodulate the data upon reception. The use of PN codes for modulating and demodulating data being transmitted is in accordance with CDMA technology. To acquire a forward link signal, a terminal performs multiple searches for a pilot channel carried by the forward link signal until the pilot channel is detected. To acquire a reverse link signal, the hub searches for access probes from any terminals during search windows that take place during the beginning of access slots that occur periodically at the hub. The access probes signify the beginning of a series of reverse link transmissions from a terminal. In general, a terminal becomes synchronized with the forward link signal before the hub becomes synchronized with the reverse link signal because the pilot signal from the hub is made available constantly, while access probes are only generated when communication with the associated terminal is being initialized.

In any wireless telecommunication system, transmissions between the hub and a terminal are delayed a certain amount because of the distance between the two systems. The amount of this delay will vary as the distance between the hub and terminal is modified by the movement of either system. This variation in delay can complicate the signal acquisition process since the exact amount of variation in delay is often unknown at a particular time. For the acquisition of the forward link signal, an unknown delay presents less of a problems because the terminal must already search in time to acquire the forward link signal, and, therefore, any time delay will be accounted for once the forward link signal is acquired. For the acquisition of the reverse link signal, however, the unknown delay is problematic because the access probe must arrive during the appropriate search window and have been modulated with a set of PN codes in the correct state in order to be detected. Therefore, any error in estimating the transmission delay will cause the access probe to go undetected. In cellular wireless telephone systems, the use of a search window at the hub is normally sufficient to compensate for the possible range of delays, as multiple searches for an access probe are performed during the search window, each offset in time. Since the range of distances between a hub and terminal in a land based cellular telephone system varies at most a by few miles, the delay uncertainty will be minimal and the use of a relatively small, or short, search window at the hub will ensure that the access probe is detected.

In satellite based wireless telecommunications systems employing the use of the hub and terminal architecture the RF signals associated with the forward and reverse links are reflected from a space based satellite during transmission. This makes the total distance traveled by the signals hundreds or thousands of miles. This increase in absolute distance also increases the variance in the distance between the hub and a terminal when compared to cellular telephone systems, which in turn increases the delay variation experienced by messages such as access probes transmitted from a terminal to the hub. In general, the delay variation is sufficiently large that the use of a search window at the hub of similar duration to that used in a digital wireless cellular telephone system is not sufficient to ensure the proper detection of an access probe. Therefore, a new method of performing signal acquisition is necessary for satellite based digital wireless telecommunications systems employing CDMA technology.

Despite the need for a new method of performing signal acquisition, it is preferable to implement and utilize as much existing cellular telephone equipment as possible in any new satellite based telecommunication system. Using existing cellular telephone equipment provides increased economy, and also allows one to incorporate new advances achieved in digital cellular telephone systems including higher efficiency and higher quality signal transmission. Thus, a method and apparatus for signal acquisition that allows existing cellular wireless telecommunications equipment to be used in the context of large delay uncertainty satellite based telecommunications system would be highly desirable. Additionally, because modifications in software can be implemented far more easily and with less expense than modifications in hardware, any new method for signal acquisition that allowed existing cellular wireless telecommunication systems or equipment to be used via modification of software would be more desirable still.

SUMMARY OF THE INVENTION

The present invention is a novel and improved method and apparatus for signal acquisition in a wireless telecommunication system having large transmission delay uncertainty. A terminal first acquires the forward link signal from a hub and extracts timing information from that forward link signal. Using the timing information the terminal estimates the time at which the next access slot occurs, and the transmission time and PN code state necessary for an access probe to arrive at the hub in condition to be properly detected assuming the terminal is located a maximum distance from the hub. Each subsequent access probe is transmitted at a time interval T plus time offset $\partial$ (T+$\partial$) after the transmission of the previous access probe, where time T is equal to the access slot period and time $\partial$ is some amount of time less than the duration of a search window associated with each access slot. In order for the access probes to be processed in accordance with the state of the PN codes at the hub upon reception, the state of the internal PN codes at the transmitting terminal are incremented by time interval T for each access probe transmitted. Thus, for each access probe the time interval from the transmission of the previous access probe is incremented by T+$\partial$, while the state of the internal PN codes are incremented by T. The result is that the search for the appropriate time offset is only performed via adjustment of the transmission time and not the state of the PN codes, and, therefore, the search process is simplified.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A method and apparatus for establishing communication within a satellite based wireless telecommunications system is provided. In the following description, the invention is set forth in the context of signal acquisition procedure performed via the use of a linear search algorithm seeded with a maximum delay assumption. While the use of a linear search is preferred in some situations due to its inherent simplicity, it should be understood that the use of a linear search is not necessary to practice the present invention. Other search techniques may be utilized including sequential, spiral, and random-walk searches. Additionally, the search can be performed with last-known-position, min-delay, or population concentration seeds. In other instances throughout the application, various systems and configurations are described in block form. This is done in order to avoid unnecessarily obscuring the disclosure of the present invention.

Figure 1:
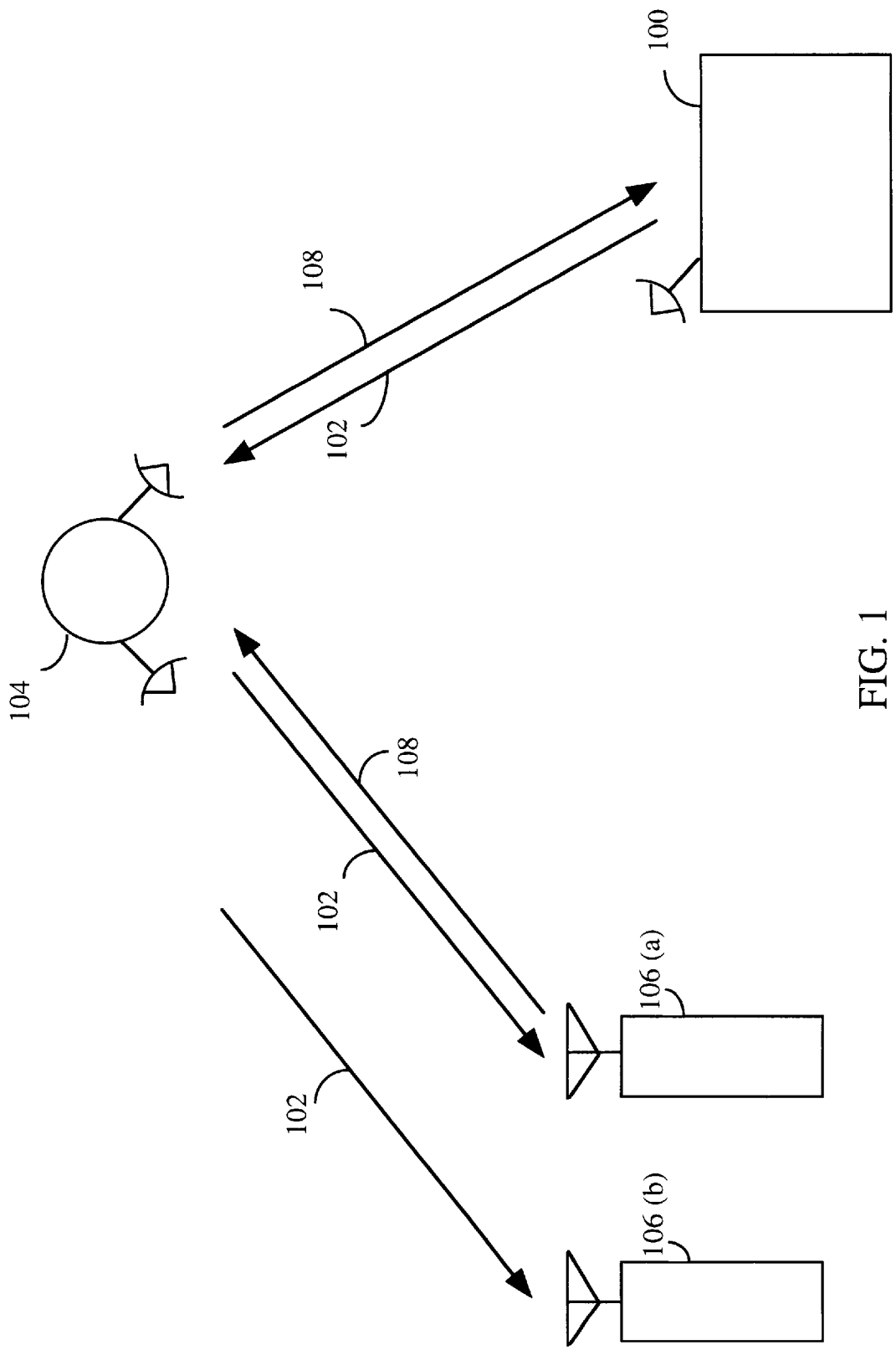
FIG. 1 is a diagram of a satellite based wireless telecommunications system.

FIG. 1 is a diagram of a satellite based telecommunications system configured in accordance with one embodiment of the invention. Hub 100 generates a forward link signal 102 that is reflected towards terminals 106(a) and (b) by satellite 104. Terminal 106(a) generates a reverse link signal 108 which is reflected by satellite 104 towards hub 100. Forward link signal 102 carries various kinds of data necessary to conduct the forward link portion of multiple communications (such as a telephone call) with terminals 106(a) and (b), including pilot data, paging data, synchronization data, and multiple sets of traffic data. Each set of traffic data carried by forward link signal 102 consists of information directly associated with a communication being conducted with a particular terminal 106, which in the case of a telephone call corresponds to audio information. The pilot, paging and synchronization data consists of information that may be used by multiple terminals 106. Reverse link signal 108 carries the reverse link traffic data associated with the reverse link portion of a single communication between terminal 106(a) and hub 100 as well as access information including access probes used for reverse link signal acquisition and call initiation. In general, hub 100 provides an interface to at least one wirebased network (not shown) such as a standard public switched telephone network, and thus allows a user of a terminal 106 to exchange information with other users of the wire based network in a highly mobile fashion.

In the preferred embodiment of the invention, both forward link signal 102 and reverse link signal 108 are generated and processed in accordance with code division multiple access (CDMA) spread spectrum techniques, the use of which is well known in the art. One example of such is a technique based on the IS-95 wireless protocol adopted by the Telecommunications Industry Association (2001 Pennsylvania Avenue, N.W., Washington, D.C. 20006). CDMA wireless spread spectrum communications utilize forward and reverse link channel codes and forward and reverse link spreading codes to direct sequence modulate multiple sets of information via RF signals. In the preferred embodiment of the invention, the data is bi-phase shift key modulated (BPSK) with the channel codes and quad-phase shift key (QPSK) modulated with the spreading codes. Direct sequence modulation of the data using channel and spreading codes allows the various kinds of data described above to be carried by the forward and reverse link signals and improves the likelihood of successful transmission of the data via an RF signal. Additionally, the use of both the channel and spreading codes increases the amount of data that may be transmitted over a given RF bandwidth. The forward link channel codes consist of a set of orthogonal Walsh codes each defining a single channel, and the reverse link channel codes consist of terminal specific reverse link pseudorandom (PN) long codes used to modulate reverse link traffic data. The forward and reverse link spreading codes each consist of a PN spreading code that is applied to all the data being transmitted in a periodic manner. The same codes are used to extract the data from forward link or reverse link RF signals once received via the process of demodulation.

In order for a CDMA wireless transmission to process the forward and reverse link signals properly, the transmitting and receiving systems must be synchronized such that the portions of the codes used to process the data at transmission and reception are the same. This synchronization is achieved during the process of signal acquisition performed when a terminal 106 first establishes communication with hub 100. During signal acquisition, terminal 106 first acquires the forward link signal 108 by searching for the pilot channel associated with the forward link signal 108 by modulating any RF signals received within the appropriate bandwidth. The RF signals are modulated with the forward link spreading code and associated pilot channel code at various time offsets until an increased energy level is detected. Hub 100 then constantly attempts to acquire the reverse link signal by monitoring for access probes transmitted by terminals 106 during the access slots described above which occur periodically as a function of the system time maintained at hub 100. During any one access slot, hub 100 monitors for access probes transmitted from a sub-set of the total set of terminals 106 available. The sub-set of terminals 106 is determined as a function of some unique characteristic of the terminal, such as a terminal identification code and both the hub 100 and a terminal 106 will be able to calculate the appropriate access slot and search window based on the system time.

The access probes from terminals 106 consist of the transmission of an access preamble message via a reverse link signal 108 processed with the reverse link channel and spreading codes. The access probes are interpreted by hub 100 as requests to establish communication, and in preferred embodiment of the invention the preamble message is all logic zeros. In order for an access probe to be detected, it must arrive during the access slot assigned to the transmitting terminal 106 within a certain margin of error that is determined by the search windows during which hub 100 actually performs multiple searches for the access probe at various time offsets. In the preferred embodiment of the invention, the duration of a search window is 416.66 microseconds ($\mu$s) which is the same duration of a search window used in existing cellular telephone systems. The searching is performed by processing any radio frequency signals of a predetermined bandwidth that are received by hub 100 at various time offsets using the set of reverse link codes. The proper state of the reverse link codes used during the search window are also determined as a function of the system time.

Figure 2:
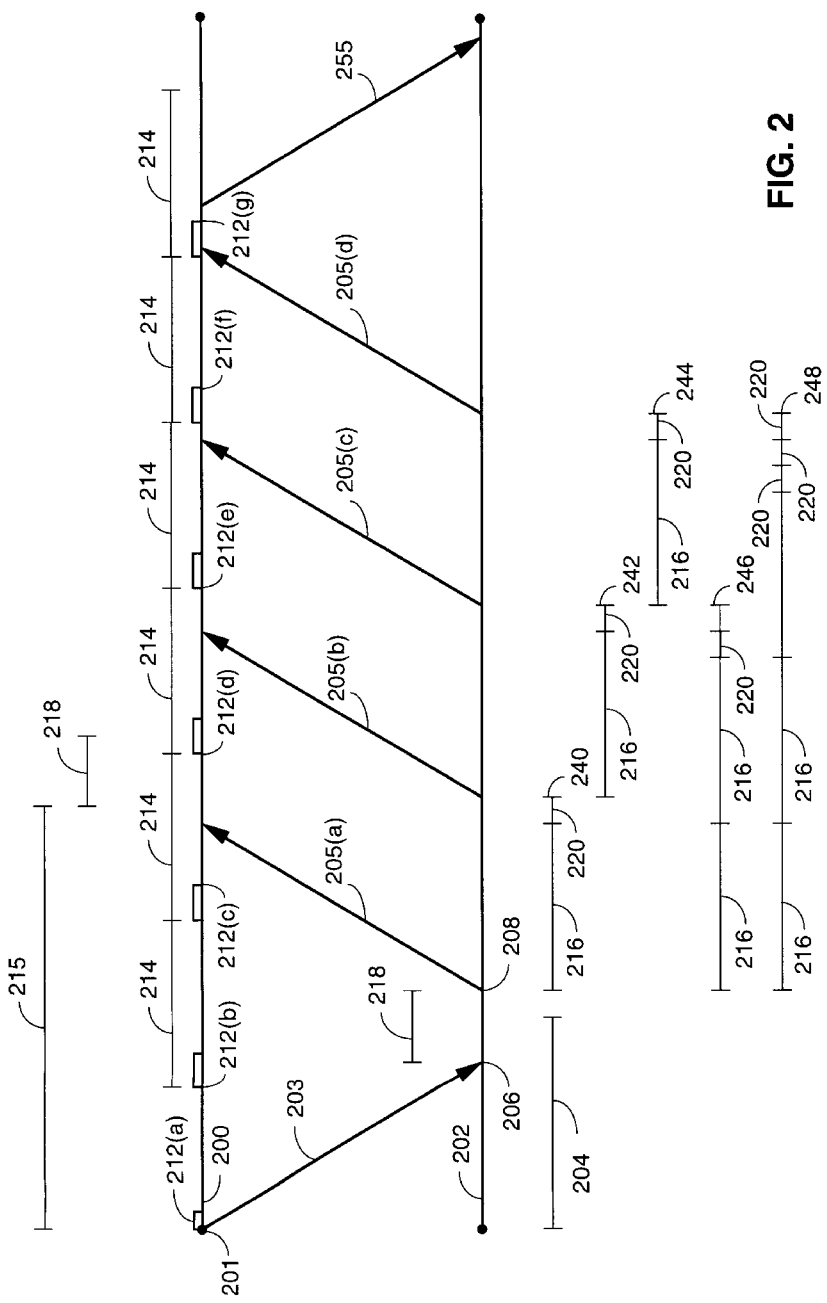
FIG. 2 is a timing diagram illustrating the timing associated with signal acquisition.

In order for communication to properly be established, the access probe must be transmitted at the proper time so as to arrive at the hub during the search window associated with the proper access slot and then processed with the reverse link codes configured in the proper state. FIG. 2 is a timing diagram illustrating the transmissions associated with an exemplary signal acquisition procedure performed by terminal 106(b) in accordance with one embodiment of the invention. Time proceeds from left to right, and line 200 represents time at the hub 100 (hub time) and line 202 represents time at terminal 106(b) (terminal time). The arrows extending between hub time 200 and terminal time 202 indicate the transmission of messages via radio frequency signals in the direction indicated by the arrow. Access slots 214 occur at regular intervals separated by an amount of time equal to access slot period 216, which is referred to as period 'T'. Access probes are searched for during search windows 212(a)–(g) which occur at the beginning of each access slot 214, in the preferred embodiment of the invention as shown. Maximum one way delay interval 204 is the time necessary for the transmission of a message between hub 100 and terminal 106(b) when terminal 106(b) is located the maximum distance from hub 100, and in the preferred embodiment of the invention, is on the order of 250 ms, with a delay uncertainty of 25 ms. Maximum round trip delay interval 215 is equal to twice maximum one way delay interval 204.

After first acquiring a forward link signal from hub 100 via repeated searching for an associated pilot signal, terminal 106(b) receives a synchronization message 203 at time 206 that was transmitted from hub 100 at time 201. In the preferred embodiment of the invention, the synchronization message indicates the system time at hub 100 at time 201 minus three-hundred and twenty (320) ms, which is in accordance with the IS-95 protocol, however, this offset is not necessary to practice the present invention. Terminal 106(b) uses the system time provided by synchronization message 203 to calculate the next search window 212 for which sufficient time is available to allow an access probe to be received at hub 100 in a timely manner. As noted above, the time at which a search window 212 occurs is determined as a function of system time. During this calculation it is assumed that terminal 106(b) is located the maximum distance away from hub 100, and that any transmissions between terminal 106(b) and hub 100 are also delayed by a maximum one way delay 204. Since two transmissions must occur during acquisition, one for the synchronization message and the other for an access probe, this assumption results in the next available access slot being determined to be the next one occurring more than one maximum round trip delay 215 after time 201 which corresponds to search window 212(d).

In addition to calculating the next available search window using the system time provided by synchronization message 203, terminal 106(b) determines the proper state of the reverse link PN traffic code and the reverse link PN spreading code at hub 100 during that search window, which is also calculated as a function of system time, and sets the state of its internal reverse link PN traffic code and reverse link PN spreading code to like states. In the signal acquisition procedure shown in FIG. 2 the next available search window will be calculated to be search window 212(d). Terminal 106(b) then generates access probe 205(a) using its internal reverse link PN traffic code and reverse link PN spreading code set in accordance with the state of such codes at the hub during search window 212(d), and transmits that access probe at time 208, which follows time 206 by a time interval 218. Time 208 will be referred to as time To.

Time interval 218 corresponds to the difference between the time interval from time 201 to search window 212(d) and maximum round trip delay 215. Transmitting access probe 205(a) after time 206 by an amount equal to time interval 218 will cause access probe 205(a) to arrive at hub 100 during search window 212(d) if terminal 106(b) is located the maximum distance from hub 100, since the total delay from time 201 would be equal to maximum round trip delay 215 due to the two transmissions plus time interval 218 which is the entire interval between the reception of synchronization message 203 and transmission of access probe 205(a). In the exemplary signal acquisition shown, however, terminal 106(b) is located less than the maximum distance from hub 100, thus causing access probe to arrive at hub 100 before search window 212(d). This causes the access probe to go undetected by hub 100 since hub 100 is not searching for an access probe at that time.

Terminal 106(b) proceeds with the signal acquisition process by transmitting additional access probes 205(b)–(d) as shown. Access probes 205(b)–(d) are directed to access slots 212(e)–(g) respectively, and each is transmitted at a time interval T 215 plus time offset $\partial$ 220 (T+$\partial$) after the transmission of the previous access probe, as shown by time lines 240, 242, and 244. (Not to scale). Additionally, in order for access probes 205(b)–(d) to be processed in accordance with the state of the reverse link codes at hub 100 during access slots 212(e)–(g), terminal 106(b) increments the state of its internal reverse link PN codes by time interval T for each access probe 205. Thus, for each access probe 205 the time interval from the transmission of previous access probe is incremented by T+$\partial$, while the state of the internal reverse link PN channel code and reverse link PN spreading code is incremented by T. The result of incrementing the time at which each access probe 205 is transmitted by an amount T+$\partial$, and incrementing the state of the reverse link PN channel and spreading codes by time T, is that for access probe 205(b) the associated transmission time is at time T0+T+$\partial$, as shown by time line 240, while the state of the two codes for the transmission is T0+T. For access probe 205(c) transmission time is T0+2T+2$\partial$ as shown by time line 246, while the state of the two codes is T0+2T and access probe 205(d) the transmission time is T0+3T+3$\partial$, as shown by time line 248, while the reverse link PN channel and spreading codes are in state T0+3T.

In the exemplary reverse link signal acquisition process shown in FIG. 2, terminal 106(b) is located less than the maximum distance from hub 100. The result is that access probe 205(a) arrives at hub 100 before search window 212(d) and therefore goes undetected as noted above, since a delay of less than a maximum round trip delay 215 has incurred during the transmission of synchronization message 203 and access probe 205(a). By incrementing the transmission time for the next access probe 205(b) by T+∂, however, the time at which access probe 205(b) will arrive at hub 100 will be closer to search window 212(e) than access probe 205(a) is with respect to search window 212(d). Additionally, by incrementing the state of the two reverse link codes by amount T access probe 205(b) will be generated such that it could be properly detected by hub 100 if it did arrive during search window 212(e).

As the transmission time for each additional access probes 205 is incremented by T+∂, those access probes arrive at hub 100 closer in time to the respective search window 212 until access probe 205(d) arrives during search window 212(g) causing acknowledgment message 255 to be transmitted. Making time offset ∂ less than the duration of a search window 212, it is ensured that the arrival of an access probe 205 will not skip over a search window and that an access probe will eventually arrive at hub 100 during an appropriate search window. In the preferred embodiment of the invention, a series of access probes 205 are transmitted in a pipelined manner until an acknowledgment message is received, or a maximum number of access probes have been transmitted. However, in alternative embodiments of the invention, an access probe 205 may be first transmitted and then a period of time allowed to expire so that an acknowledgment message 255 may be received before another access probe 205 is transmitted. Upon receiving acknowledgment message 255 the correct timing is known by terminal 106(b).

In an alternative view of the present invention, terminal 106(b) maintains an internal system time similar to that maintained at hub 100. When synchronization message 203 is received, terminal 106(b) sets the internal system time to one maximum one way delay more than that provided in the synchronization message 203, adjusted by the 320 ms offset. Terminal 106(b) then sets the state of its internal channel and spreading codes and calculates the time at which the appropriate search window 212 occurs as a function of the internal system time, and transmits an access probe 205 at the time calculated. Additionally, terminal 106(b) subtracts delta time interval 220 while allowing the system clock to run and when the next access slot occurs according to the updated internal system time, terminal 106(b) transmits an additional access probe 205. Using this method the next transmission time occurs after the transmission of the previous access probe 205 by a time period T+∂, as shown above. While the effect of this alternative view of the invention is the same, it may provide additional insight into the operation of the present invention.

Thus, a method and apparatus for signal acquisition in a wireless telecommunications system having large delay uncertainty has been described. Because a terminal 106 can be configured via software to generate multiple access probes separated in time by known amounts, and systems and circuits generating search windows of the duration described above already exist, the above described method and apparatus for signal acquisition in a wireless telecommunications system allows existing cellular infrastructure equipment to be utilized in the context of a satellite telecommunications system with little or no hardware adjustment. Since software adjustment can be performed more easily than hardware, this reduces the overall cost of developing and implementing such a satellite based system. The description of the preferred embodiment is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for signal acquisition in a wireless communication system between a terminal and a hub comprising the steps of:

transmitting a system time message from said hub at a system message transmit time;

receiving said system time message at said terminal at a system message receive time following said system message transmit time by an unknown amount of time;

determining a first access probe transmit time for transmitting a first access probe from said terminal;

transmitting said first access probe from said terminal at said first access probe transmit time; and sequentially transmitting a plurality of additional access probes each offset from one another by an amount of time equal to said time period adjusted by a delta time interval, wherein said delta time interval is set to a duration shorter than the duration of any one of a set of predetermined sequential search windows employed by said hub, said search windows of substantially equal duration and offset from one another by a set time period.

2. The method of claim 1 wherein said first access probe transmit time is determined by:

predicting a current transmission distance from said terminal to said hub;

determining a total transmission time from terminal to hub based on said predicted distance; and setting the first access probe transmit time to a point in time so as to ensure that, if the terminal is located the predicted transmission distance from the hub, a first access probe sent at the first access probe time from said terminal to said hub will arrive at said hub during a first search window of said set of search windows.

3. The method of claim 2 wherein said current transmission distance is predicted to be at a maximum predetermined transmission distance and wherein said first access probe transmit time is further determined by the steps of:

determining a maximum round trip transmission delay from terminal to hub for said maximum predetermined transmission distance;

subtracting said maximum round trip delay from a time interval between said system message transmit time to said first search window to yield an adjust time interval; and setting said first access probe transmit time equal to said system message receive time plus said adjust time interval.

4. The method of claim 2 further comprising the steps of:

determining, at said terminal, a state of a reverse link channel code for use at said hub during said first search window;

setting an internal reverse link channel code at said terminal to said state;

processing said first access probe, at said terminal, using said internal reverse link channel code;

for each additional access probe, successively determining additional internal reverse link channel codes for use at said hub during successive additional search windows; and processing said additional access probes using said additional internal reverse link channel codes.

5. The method of claim 2 further comprising the steps of:

determining, at said terminal, a state of a reverse link spreading code to be used at said hub during said first search window;

setting an internal reverse link spreading code at said terminal to said state;

processing said first access probe, at said terminal, using said internal reverse link spreading code;

for each additional access probe, successively determining additional internal reverse link spreading codes for use at said hub during successive additional search windows; and processing said additional access probes using said additional internal reverse link spreading codes.

6. The method of claim 5 further comprising the step of acquiring at said terminal a forward link signal transmitted by said hub.

7. The method of claim 1 wherein said plurality of additional access probes are transmitted until an acknowledgment message is received at said terminal acknowledging receipt of one of said access probes by said hub within one of said search windows.

8. The method of claim 7 further including the step of determining the correct transmission distance from terminal to hub from said acknowledgement signal.

9. The method of claim 1 where said plurality of additional access probes are transmitted until a maximum number of additional access probes have been transmitted.

10. A wireless telecommunications system comprising:

a hub for transmitting a system time message from said hub at a system message transmit time and for searching for access probes during a set of predetermined sequential search windows of substantially equal duration and offset from one another by a set time period; and a terminal for receiving said system time message at a system message receive time following said system message transmit time by an unknown amount of time, for determining a first access probe transmit time for transmitting a first access probe from said terminal, for transmitting said first access probe from said terminal at said first access probe transmit time, and for sequentially transmitting a plurality of additional access probes each offset from one another by an amount of time equal to said time period adjusted by a delta time interval, wherein said delta time interval is set to a duration shorter than the duration of said search windows.

11. The wireless telecommunications system of claim 10 wherein said plurality of additional access probes are transmitted by said terminal until a maximum number of additional access probes have been transmitted.

12. The wireless telecommunications system of claim 10 wherein said terminal transmits a plurality of additional access probes until an acknowledgement message is received at said terminal acknowledging receipt of one of said access probes by said hub within one of said search windows.

13. The wireless telecommunications system of claim 12 wherein said terminal additionally determines the correct transmission distance from terminal to hub from said acknowledgement signal.

14. The wireless telecommunications system of claim 10 wherein said terminal determines said first access probe transmit time by predicting a current transmission distance from said terminal to said hub, determining a total transmission time from terminal to hub based on said predicted distance, then setting the first access probe transmit time so as to ensure that, if the terminal is located the predicted transmission distance from the hub, a first access probe sent at the first access probe time from said terminal to said hub will arrive at said hub during a first search window of said set of predetermined sequential search windows.

15. The wireless telecommunications system of claim 14 wherein said terminal predicts said current transmission distance to be at a maximum predetermined transmission distance and wherein said terminal further determines said first access probe transmit time by:

determining a maximum round trip transmission delay from terminal to hub for the maximum predetermined transmission distance;

subtracting said maximum round trip delay from a time interval between said system message transmit time to said first search window to yield an adjust time interval; and setting said first access probe transmit time equal to said system message receive time plus said adjust time interval.

16. The wireless telecommunications system of claim 14 wherein said terminal determines a state of a reverse link spreading code to be used at said hub during said first search window, sets an internal reverse link spreading code at said terminal to said state, processes said first access probe using said internal reverse link spreading code, and for each additional access probe, successively determines additional internal reverse link spreading codes for use at said hub during successive additional search windows, and processes said additional access probes using said additional internal reverse link spreading codes.

17. The wireless telecommunications system of claim 14 wherein said terminal determines a state of a reverse link channel code for use at said hub during said first access slot, sets an internal reverse link channel code at said terminal to said state, processes said first access probe using said internal reverse link channel code, and, for each additional access probe, successively determines additional internal reverse link channel codes for use at said hub during successive additional search windows, and processes said additional access probes using said additional internal reverse link channel codes.

18. The wireless telecommunications system of claim 17 wherein said terminal acquires a forward link signal transmitted by said hub.

19. A system for signal acquisition in a wireless communication system between a terminal and a hub comprising:

means for transmitting a system time message from said hub at a system message transmit time;

means for receiving said system time message at said terminal at a system message receive time following said system message transmit time by an unknown amount of time;

means for determining a first access probe transmit time for transmitting a first access probe from said terminal;

means for transmitting said first access probe from said terminal at said first access probe transmit time; and means for sequentially transmitting a plurality of additional access probes each offset from one another by an amount of time equal to said time period adjusted by a delta time interval, wherein said delta time interval is set to a duration shorter than the duration of any one of a set of predetermined sequential search windows employed by said hub, said search windows of substantially equal duration and offset from one another by a set time period.

20. The system of claim 19 wherein said means for determining said first access probe transmit time comprises:

means for predicting a current transmission distance from said terminal to said hub;

means for determining a total transmission time from terminal to hub based on said predicted distance; and means for setting the first access probe transmit time to a point in time so as to ensure that, if the terminal is located the predicted transmission distance from the hub, a first access probe sent at the first access probe time from said terminal to said hub will arrive at said hub during a first search window of said set of search windows.

21. A method for establishing wireless communication with a hub located an unknown transmission distance away, said method comprising the steps of:

(a) receiving a system time message delayed by an amount no greater than a maximum delay;

(b) adjusting an internal time to said system time plus one predetermined maximum round trip delay;

(c) transmitting an access probe at a next time slot according to said internal system time;

(d) adjusting said internal time by a delta time interval that is less than the duration of any one of a set of predetermined sequential search windows employed by said hub, said search windows of substantially equal duration and offset from one another by a set time period; and (e) transmitting a second access probe at a next available time slot offset by said time period and calculated according to said internal system time.

* * * * *